US008424979B2

(12) United States Patent
Tani

(10) Patent No.: US 8,424,979 B2
(45) Date of Patent: Apr. 23, 2013

(54) BRAKE SYSTEM OF MOTORCYCLE

(75) Inventor: Kazuhiko Tani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1817 days.

(21) Appl. No.: 11/710,544

(22) Filed: Feb. 26, 2007

(65) Prior Publication Data

US 2007/0200430 A1 Aug. 30, 2007

(30) Foreign Application Priority Data

Feb. 27, 2006 (JP) ................................ 2006-049790
Jan. 24, 2007 (JP) ................................ 2006-013618

(51) Int. Cl.
*B60T 8/32* (2006.01)

(52) U.S. Cl.
USPC ...... 303/137; 303/9.62; 303/9.64; 303/113.1; 303/113.2; 303/116.2; 188/105; 188/106 P; 188/344; 188/345

(58) Field of Classification Search .................. 303/137, 303/9.64, 170, 113.1–113.2, 138–139, 113.4, 303/20, 155, DIG. 10, DIG. 11, 15, 11, 116.2, 303/345, 115.5, 10, 2, 119.2, 115.1, 116; 188/344, 345
See application file for complete search history.

(56) References Cited

U.S. PATENT DOCUMENTS

| | | | | |
|---|---|---|---|---|
| 6,543,859 | B2 * | 4/2003 | Sakamoto | 303/113.2 |
| 6,969,128 | B2 * | 11/2005 | Sekihara | 303/113.1 |
| 2002/0011386 | A1 * | 1/2002 | Tani et al. | 188/106 P |
| 2002/0035832 | A1 | 3/2002 | Nakamura et al. | |
| 2002/0125764 | A1 | 9/2002 | Sakamoto | |
| 2003/0015916 | A1 * | 1/2003 | Sakamoto | 303/137 |
| 2003/0056871 | A1 * | 3/2003 | Nakajima et al. | 156/73.5 |
| 2004/0041467 | A1 * | 3/2004 | Giers et al. | 303/20 |
| 2004/0046446 | A1 * | 3/2004 | Dinkel et al. | 303/119.3 |
| 2005/0168060 | A1 * | 8/2005 | Tani et al. | 303/9.62 |
| 2006/0082216 | A1 * | 4/2006 | Hamm et al. | 303/9.64 |

FOREIGN PATENT DOCUMENTS

| | | | |
|---|---|---|---|
| EP | 1277635 | A2 | 1/2003 |
| EP | 1652745 | A1 | 5/2006 |
| JP | 10-250568 | A | 9/1998 |
| JP | 2000-6779 | A | 1/2000 |
| JP | 2000-071963 | A | 3/2000 |
| JP | 2002-264787 | A2 | 9/2002 |
| JP | 2005-231421 | A2 | 9/2005 |
| JP | 2006-021580 | A2 | 1/2006 |
| WO | WO 2005/035330 | A1 | 4/2005 |

* cited by examiner

*Primary Examiner* — Robert A Siconolfi
*Assistant Examiner* — San Aung
(74) *Attorney, Agent, or Firm* — Birch, Stewart, Kolasch & Birch, LLP

(57) ABSTRACT

A reduction in size, weight and cost of a brake system of a motorcycle provided with a circulating-type ABS is achieved by a brake system provided with a circulating-type ABS and a by-wire-type brake system. In the brake system, solenoid valves, hydraulic pressure sensors, accumulators and pumps are integrated into a unit, and concurrently stroke simulators are attached to the unit as separate bodies.

9 Claims, 8 Drawing Sheets

ECU
100A
100B
225 (220)
10, 10a
11
9
12
13
15
15a
16
17
18
21
22
23
24
26
27
28
29
31
31a
32
33
33a
34
34a
34b
35
36
37
37a
38
39
41
42
43a (43)
43b (43)
44a (44)
44b (44)
45
47
48
49
51
52
53
54
55
56
58
59
M
P

ECU
M
P
325 (320)
100A
100B
10, 10a
15a
37a
43a (43)
43b (43)
44a (44)
44b (44)

BRAKE SYSTEM OF MOTORCYCLE

CROSS-REFERENCE TO RELATED APPLICATIONS

This nonprovisional application claims priority under 35 U.S.C. §119(a) on Patent Application Nos. 2006-049790 and 2006-013618, filed in Japan on Feb. 27, 2006 and Jan. 24, 2007, respectively. The entirety of each of these documents is incorporated herein by reference.

BACKGROUND OF THE INVENTION

1. Field of the Invention

The present invention relates to a brake system of a motorcycle, which is equipped with a circulating-type ABS.

2. Background of the Invention

A motorcycle equipped with a circulating-type ABS, is known, wherein a combined brake system for front and rear wheels is constituted by using a pump included in the ABS (for example, see Japanese Patent Publication No. 3457190 and Japanese Patent Laid-open Official Gazette No. 2000-6779).

SUMMARY OF THE INVENTION

In the above-described conventional technique, the use of a solenoid valve provided between the ABS and a master cylinder has been examined, to constitute a by-wire-type brake system. In this case, although it is desirable to make the brake system into a single unit for the purpose of reduction in size and weight thereof, on the other hand, an effect in cost reduction by making the unit versatile is also required.

The present invention has been made in consideration of the above-described circumstances. An object of the present invention is to achieve reduction in size, weight and cost of a brake system of a motorcycle, which brake system is provided with a circulating-type ABS having a self-pressurizing function.

As means for solving the problem, a first aspect of the present invention is directed to a brake system of a motorcycle, which brake system is provided with a circulating-type ABS (e.g., a circulating-type ABS 100A in embodiments) and a by-wire-type brake system (e.g., a by-wire-type brake system 100B in the embodiments). The circulating-type ABS includes an ABS solenoid valve (e.g., fourth and sixth solenoid valves 34 and 36 in the embodiments) blocking a hydraulic pressure passage between a caliper (e.g., front and rear calipers 13 and 18 in the embodiments) and a master cylinder (e.g., front and rear master cylinders 10 and 15 in the embodiments). The circulating-type ABS also includes an accumulator (e.g., an accumulator 55 in the embodiments) receiving hydraulic pressure of the caliper at the time of the blocking, and a pump (e.g., a pump 37 in the embodiments) circulating brake fluid to the hydraulic pressure passage from the accumulator. The by-wire-type brake system includes a by-wire solenoid valve (e.g., first, second, third and fifth solenoid valves 31, 32, 33 and 35 in the embodiments) blocking the hydraulic pressure passage between the master cylinder and the ABS. The by-wire-type brake system also includes a first hydraulic pressure sensor (e.g., a first hydraulic pressure sensor 38 in the embodiments) detecting the hydraulic pressure of the master cylinder, a second hydraulic pressure sensor (e.g., a second hydraulic pressure sensor 39 in the embodiments) detecting the hydraulic pressure of the caliper, and a stroke simulator (e.g., a stroke simulator 48 in the embodiments) receiving the hydraulic pressure of the master cylinder at the time of operating the by-wire solenoid valve. The by-wire-type brake system also includes a fluid reservoir (e.g., an inside brake fluid reservoir 49 in the embodiments) connected to the hydraulic pressure passage on a downstream side of the by-wire solenoid valve, and concurrently on an upstream side of the ABS. In the brake system, the ABS and by-wire solenoid valves, the first and the second hydraulic pressure sensors, the accumulator and the pump are integrated into a unit while the stroke simulator is attached to the unit as a separate body.

According to a second aspect of the present invention, the fluid reservoir is attached to the unit as a separate body.

According to a third aspect of the present invention, the brake system includes front and rear input circuits which are independent of each other, and the by-wire-type brake system is provided to the input circuit of a front wheel brake, and hydraulic pressure of the input circuit of a rear wheel brake is detected, and thus a front wheel braking force is increased.

According to a fourth aspect of the present invention, the by-wire-type brake system is provided to each one of the input circuits of the front and the rear wheel brakes.

According to a fifth aspect of the present invention, the fluid reservoir is connected to the hydraulic pressure passage between the by-wire solenoid valve and the ABS.

According to the first aspect of the present invention, the stroke simulator is provided separately from the unit. Therefore, the capacity and setting, such as a large type or a small type and such as a single disk type or a double disk type, of the stroke simulator vary depending on the type of a vehicle, and the unit includes only sharable components, regardless of the type of a vehicle. This makes it possible to make the unit itself versatile, and thus to achieve cost reduction.

According to the second aspect of the present invention, for master cylinders having different capacities, fluid reservoirs corresponding thereto can be selected as appropriate. Accordingly, there is no need to set, in advance, a fluid reservoir having a large (i.e., sufficiently large) capacity in the unit. As a result, reduction in size and weight of a brake system can be achieved.

According to the third aspect of the present invention, a brake system, in which front and rear brakes coordinate with each other only at the time of operating a rear brake, can be provided at a low price.

According to the fourth aspect of the present invention, a combined brake system can be provided.

According to the fifth aspect of the present invention, hydraulic pressure passages can be simplified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
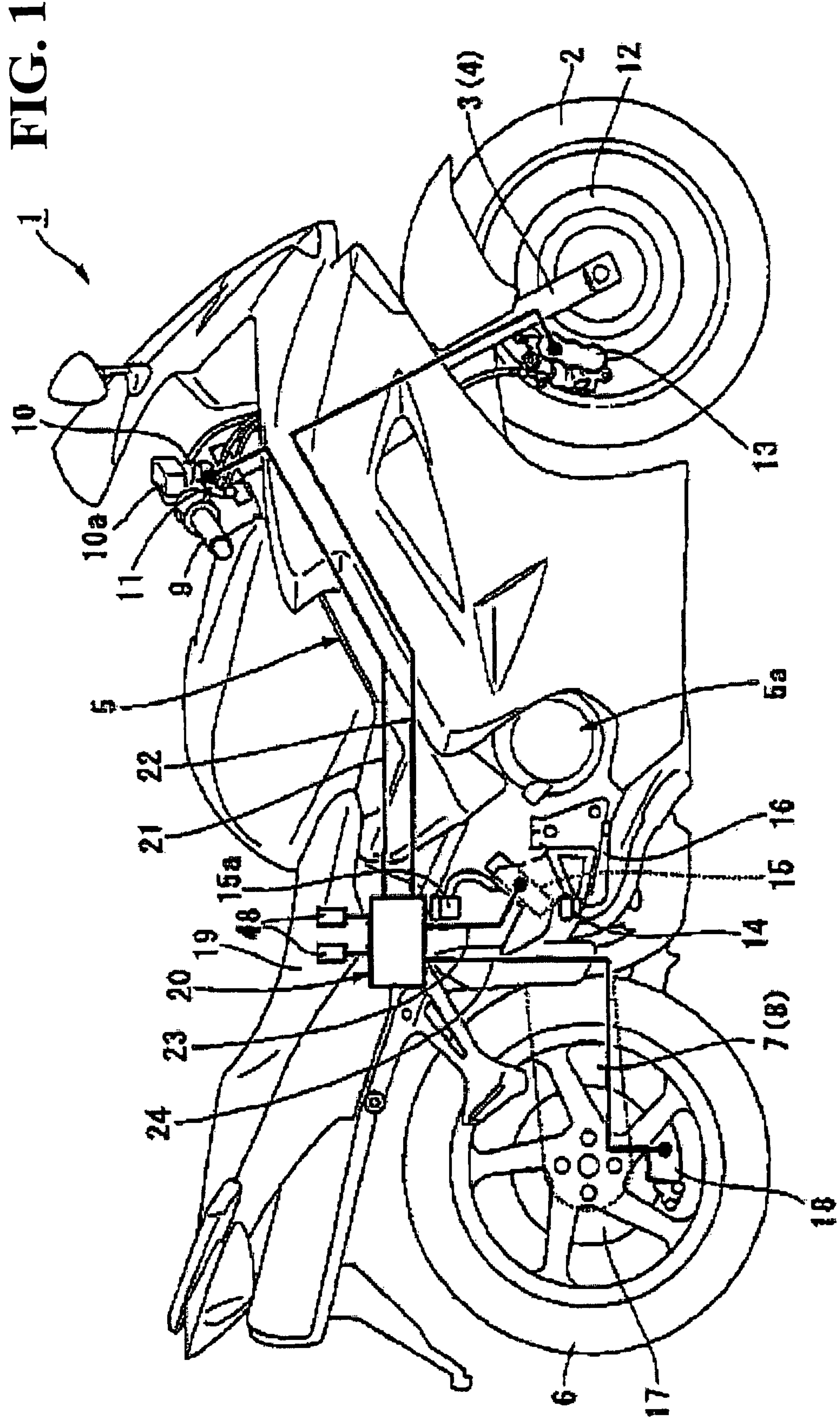
FIG. 1 is a right side elevational view of a motorcycle of an embodiment of the present invention.

The present invention will now be described in detail with reference to the accompanying drawings, wherein the same reference numerals will be used to identify the same or similar elements throughout the several views. It should be noted that in the following description, terms such as front, rear, left and right, should be considered to correspond to the directions of a vehicle, unless otherwise stated. In addition, in the drawing, an arrow FR indicates a forward direction of a vehicle; an arrow LH indicates a left direction of a vehicle; and an arrow UP indicates an upward direction of a vehicle.

Embodiment 1

In a motorcycle 1 shown in FIG. 1, a front wheel 2 is rotatably supported by the lower ends of left and right front forks 3. A front wheel suspension system 4 composed mainly of the left and the right front forks 3 is pivotally supported on a front end of a body frame 5 so as to be steerable. A rear wheel 6 is rotatably supported by a single swing arm 7, while the rear end of the swing arm 7 is attached only to the left side of the rear wheel 6. A rear wheel suspension system 8 composed mainly of the swing arm 7 is pivotally supported at the middle part of the body in the longitudinal direction thereof, e.g., a rear end of an engine 5*a* so that the rear wheel suspension system 8 can swing in the vertical direction.

Left and a right handlebars 9 are attached to an upper end of the front wheel suspension system 4. A front master cylinder 10 and a brake lever (a front wheel brake operator) 11 are attached to the right one of the handlebars 9. The front master cylinder 10 generates hydraulic pressure (oil pressure) mainly for a front wheel brake. The brake lever 11 causes the front master cylinder 10 to activate. Left and right front disks 12 are attached respectively to both sides of a hub part of the front wheel 2. Left and right front calipers (wheel cylinders) 13 are attached respectively to lower parts of the left and right front forks 3, and generate a front wheel braking force by gripping from both sides by the corresponding front disks 12.

Left and right steps 14 are attached to the body in the middle thereof in the longitudinal direction. A rear master cylinder 15 and a brake pedal (rear wheel brake operator) 16 are attached to the right one of these steps 14. The rear master cylinder 15 generates hydraulic pressure (oil pressure) mainly for a rear wheel brake. The brake pedal 16 causes the rear master cylinder 15 to activate. A rear disk 17 is attached to the left side of a hub part of the rear wheel 6. A rear caliper (a wheel cylinder) 18 is attached to the lower side of the rear end of the swing arm 7 and generates a rear wheel braking force by gripping from both sides by the rear disk 17.

A combined brake system (hereinafter, sometimes referred to as CBS) and an anti-lock brake system (hereinafter, sometimes referred to as ABS) are employed to a brake system of the motorcycle 1. The CBS generates both front and rear braking forces by interlocking the front and the rear calipers even at the time of operating only one of front and rear brakes. The ABS appropriately controls the slip ratios of the front and the rear wheels respectively by depressurizing the front and the rear calipers in response to slip states of the front and the rear wheels at the time of operating the front and the rear brakes.

An ABS modulator 20, which performs controls on the above-described brake systems, is disposed substantially in the middle (for example, under the rider's seat) of the body of the motorcycle 1. Hydraulic pressures generated respectively in the front and the rear master cylinders 10 and 15 are inputted respectively through front and rear input pipes 21 and 23 to the ABS modulator 20. The ABS modulator 20 supplies the hydraulic pressures, which are generated through the respective controls, to the front and the rear calipers 13 and 18 respectively through output pipes 22 and 24. Accordingly, an appropriate braking force corresponding to a ground surface condition and the like is caused. Since the ABS modulator 20, which is relatively heavy, is placed substantially in the middle of the body, the mass of the motorcycle 1 is concentrated, and a good balance of the front and rear input and output pipes 21 to 24 are made.

Figure 2:
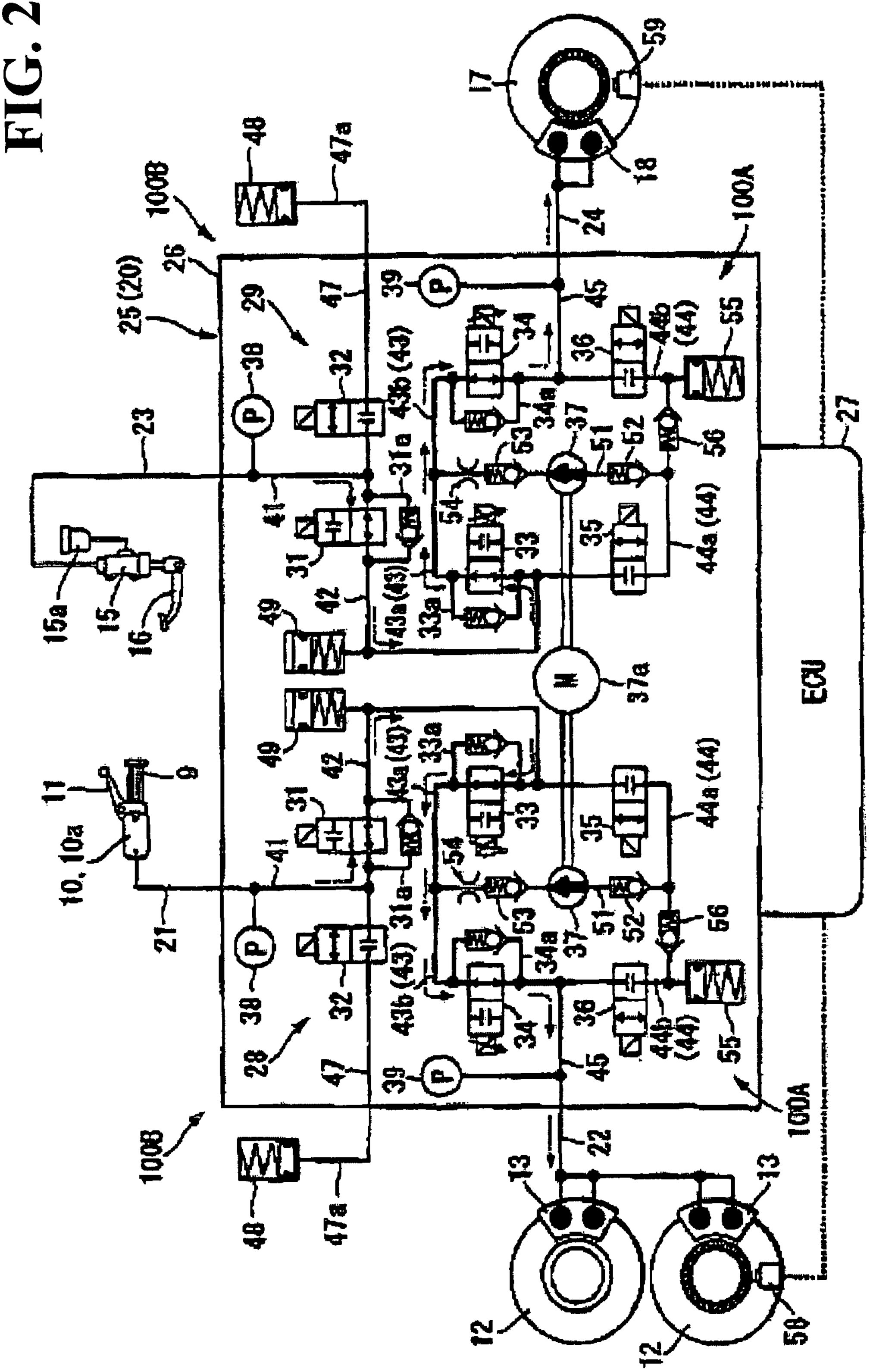
FIG. 2 is an explanatory diagram of a constitution of a brake system of the motorcycle.

As shown in FIG. 2, the ABS modulator 20 includes a hydraulic pressure circuit section 25 and an ECU (electronic control unit) 27. The hydraulic pressure circuit section 25 includes a plurality of solenoid valves 31 to 36, pumps 37 and the like. The hydraulic pressure circuit section 25 is formed in a casing 26. The ECU controls the activation of the hydraulic pressure circuit section 25. The ECU is integrally attached to the outer side of the casing 26.

The hydraulic pressure circuit section 25 is provided with a front wheel brake circuit 28 and a rear wheel brake circuit 29 which are independent of each other. The front and the rear master cylinders 10 and 15 are connected respectively to the front and the rear calipers 13 and 18 through the corresponding brake circuits 28 and 29, and the front and rear input and output pipes 21 to 24. The pumps 37, each capable of supplying brake oil (brake fluid) with pressure, are disposed respectively in the brake circuits 28 and 29. The pumps 37 can be integrally driven by the same motor 37*a*. It should be noted that, in this embodiment, the fundamental constitutions of the respective brake circuits 28 and 29 are identical.

The front and the rear input pipes 21 and 23 are connected respectively to first hydraulic pressure passages 41 in the corresponding brake circuits 28, 29. The first hydraulic pressure passages are provided respectively with first hydraulic pressure sensors 38. The first hydraulic pressure sensors 38 are capable of detecting hydraulic pressures in the corresponding passages 41, i.e., hydraulic pressures generated respectively in the front and the rear master cylinders 10 and 15. Each first hydraulic pressure passage 41 is branched into a simulation passage 47 and a second hydraulic pressure passage 42 on a downstream side (side opposite to the corresponding one of the master cylinders 10 and 15). Each second hydraulic pressure passage 42 is further branched into third and fourth hydraulic pressure passages 43 and 44. The third and the fourth hydraulic pressure passages 43 and 44 merge with each other again on the downstream side thereof into a fifth hydraulic pressure passage 45. The fifth hydraulic pressure passages 45 are connected respectively to the front and the rear output pipes 22 and 24, and are provided respectively with second hydraulic pressure sensors 39. The second hydraulic pressure sensors 39 are capable of detecting hydraulic pressures in the corresponding passages 45, i.e., hydraulic pressures supplied respectively to the front and the rear calipers 13 and 18.

In the casing 26, inside brake fluid reservoirs 49 connected respectively to the second hydraulic pressure passages 42 at intermediate positions thereof are disposed separately from outside brake reservoirs 10*a* and 15*a* which are disposed respectively in vicinities of the front and the rear master cylinders 10 and 15.

Each inside brake fluid reservoir 49 is formed by slidably housing a piston in a cylinder forming a fluid chamber, for example. The piston is biased by a spring, at a stroke-limit position on the side where the capacity of the fluid chamber is increased, and is not activated when the second hydraulic pressure passage 42 is in positive pressure. The piston moves to the side where the capacity of the chamber is decreased, when a predetermined negative pressure is applied to the second hydraulic pressure passage 42, and thereby brake fluid in the fluid chamber is discharged into the second hydraulic pressure passage 42. When the second hydraulic pressure passage 42 is recovered from the state where negative pressure is applied thereto, the piston causes the brake fluid in the second hydraulic pressure passage 42 to be sucked into the fluid chamber while returning to the stroke-limit position. Accordingly, the brake fluid is allowed to flow between the inside brake fluid reservoir 49 such as above and the front and the rear calipers 13 and 18.

In addition, for example, stroke simulators 48 are provided to the outside of the casing 26. Each stroke simulator 48 is connected to the simulation passage 47 at the middle thereof, with an outside pipe 47*a* interposed therebetween.

Each stroke simulator 48 is formed by slidably housing a piston in a cylinder forming a fluid chamber, for example. The piston is biased by a spring, at a stroke-limit position on a side where the capacity of the fluid chamber is decreased. In a case where the front and the rear master cylinders 10 and 15 are communicated respectively with the stroke simulators 48 almost in one-to-one correspondence, the pistons stroke to the side where the capacity of the chamber is increased while generating a predetermined fluid pressure depending on the amount of discharged brake fluid (the amount of control of brake operators) responding to operations of the front and the rear master cylinders 10 and 15, thereby receiving the brake fluid in communicated passages. In a case where the front and the rear master cylinders 10 and 15 have been recovered from the state of the operations, the pistons cause the brake fluid in the fluid chamber to be discharged into the communicated passages while returning to the stroke-limit position. In a case where such stroke simulators 48 are communicated, in the above-described state, respectively with the front and the rear master cylinders 10 and 15, simulated fluid pressure reactions are applied respectively to the brake operators.

In the casing 26, a pump passage 51 with the pump 37 disposed in the middle position thereof is provided between each of the third hydraulic pressure passages 43 and a corresponding one of the fourth hydraulic pressure passages 44. Each pump 37 is capable of supplying brake fluid (fluid pressure) from the fourth fluid pressure passage 44 to the third fluid pressure passage 43, with the motor 37*a* as a drive source. The drives of these respective pumps 37 (motors 37*a*) are controlled by the ECU 27. Check valves 52 and 53, which regulate the directions of the above-described supply, are respectively provided to the upstream and the downstream sides of each pump 37 on the corresponding pump passage 51. An orifice 54 which checks the pulsation of brake fluid is provided to further downstream sides of each check valve 53 located on the downstream side (on the side of the third hydraulic pressure passage 43) in the supplying direction. Hereinafter, passages on further upstream sides (on the sides of the second hydraulic pressure passages 42, and on the sides of the front and the rear master cylinders 10 and 15) than the pump passages 51 on the third and the fourth hydraulic pressure passages 43 and 44 are sometimes referred to as upstream-side third and the fourth hydraulic pressure passages 43*a* and 44*a*. Also, passages on further downstream sides (on the sides of the fifth hydraulic pressure passages 45, and on the sides of the front and the rear calipers 13 and 18) than the same are sometimes referred to as downstream-side third and fourth hydraulic pressure passages 43*b* and 44*b*.

The downstream-side fourth hydraulic pressure passage 44*b* is provided with an accumulator 55 capable of accumulating fluid pressure in the passage 44*b*. In addition, the downstream-side fourth hydraulic pressure passage 44*b* is provided with a check valve 56, which regulates the moving of hydraulic pressure from the upstream side to the downstream side in the fourth hydraulic pressure 44, on a further upstream side than the accumulator 55.

Between the inside brake fluid reservoir 49 and the first hydraulic pressure passage 41 on each second hydraulic pressure passage 42, a so-called normally-open-type first solenoid valve 31 is provided, which opens the corresponding second hydraulic pressure passage 42 at the time of energization, and which blocks the second hydraulic pressure passage 42 at the time of energization. In addition, a first relief passage 31*a* is provided to each second hydraulic pressure passage 42. The first relief passage 31*a* communicates the upstream side and the downstream side of the corresponding first solenoid valve 31, and returns hydraulic pressure to the upstream side, when the hydraulic pressure on the downstream side becomes greater than or equal to a predetermined value.

A so-called normally-closed-type second solenoid valve 32 is provided to each simulation passage 47. The second solenoid valve 32 blocks the simulation passage 47 at the time of de-energization, and opens the simulation passage 47 at the time of energization.

In the same manner as above, a normally-open-type third solenoid valve 33 is provided to each upstream-side third hydraulic pressure passage 43*a*. In the same way, a normally-open-type fourth solenoid valve 34 is provided to each downstream-side third hydraulic pressure passage 43*b*. Additionally, a second relief passage 33*a* is provided to each upstream-side third hydraulic pressure passage 43*a*. The second relief passage 33*a* communicates the upstream side and the downstream side of the corresponding third solenoid valve 33, and returns hydraulic pressure to the downstream side, when the hydraulic pressure on the upstream side becomes greater than or equal to a predetermined value. A third relief passage 34*a* is provided to each downstream-side third hydraulic pressure passage 43*b*. The third relief passage 34*a* communicates the upstream side and the downstream side of the fourth solenoid valve 34, and returns hydraulic pressure to the upstream side, when the hydraulic pressure on the downstream side becomes greater than or equal to a predetermined value.

A normally-closed-type fifth solenoid valve 35 is provided to each upstream-side fourth hydraulic pressure passage 44*a*, and a normally-closed-type sixth solenoid valve 36 is provided to the downstream-side fourth hydraulic pressure passage 44*b*.

The brake system of the motorcycle 1 is provided with circulating-type ABSs 100A and by-wire-type brake systems

100B. Each of the circulating-type ABSs 100A mainly includes the fourth and the sixth solenoid valves 34 and 36, the accumulator 55, and the pump 37. Each of the by-wire-type brake systems 100B mainly includes the first, second, third and fifth solenoid valves 31, 32, 33 and 35, the first hydraulic pressure sensor 38, the second hydraulic pressure sensor 39, the stroke simulator 48 and the inside brake fluid reservoir 49. The solenoid valves 31 to 36, the hydraulic pressure sensors 38 and 39, the accumulator 55, the pump 37 and the inside brake fluid reservoir 49 are integrated into one unit. Each of the stroke simulators 48 is attached to the casing 26 from the outside thereof separated from the unit.

The operation of the above-described brake system will now be described. FIG. 2 is a diagram showing a de-energization state in which power supplies respectively to the solenoid valves 31 to 36 and the pumps 37 (motors 37*a*) are stopped in an ignition OFF state or in a fail state. In this state, the first, third and fourth solenoid valves 31, 33 and 34 open the corresponding hydraulic pressure passages, and the second, fifth and sixth solenoid valves 32, 35 and 36 block the corresponding hydraulic pressure passages.

In the above-described state, hydraulic pressures generated respectively in the front and the rear master cylinders 10 and 15 are introduced respectively from the front and the rear input pipes 21 and 23 to the corresponding brake circuits 28 and 29 in the ABS modulator 20. Each of the introduced hydraulic pressures is then outputted, without increasing or decreasing, through the first hydraulic pressure passage 41, the second hydraulic pressure passage 42, the third hydraulic pressure passage 43 and the fifth hydraulic pressure passage 45, while led to the side of the solenoid valves which are in an open state. Thereafter, the outputted hydraulic pressures are directly supplied respectively to the front and the rear calipers 13 and 18 through the front and the rear output pipes 22 and 24. The flow of the brake fluid at this time is shown by double-dashed chain lines with arrows in FIG. 2.

In addition, at this time, each of the inside brake fluid reservoirs 49 is in a stroke-limit state on a side for increasing its own fluid chambers, and does not receive hydraulic pressure from a corresponding one of the front and the rear master cylinders 10 and 15.

As described above, in an ignition OFF state or in a fail state due to a failure or the like in the electric system, the front rear master cylinder 10 is in communication with the front caliper 13 through the brake circuit 28. Also, the rear master cylinder 15 is in communication with the rear caliper 18 through the brake circuit 29. These communications make it possible to directly supply hydraulic pressures generated in the front and the rear master cylinders 10 and 15, respectively, to the front and the rear calipers 13 and 18.

Figure 3:
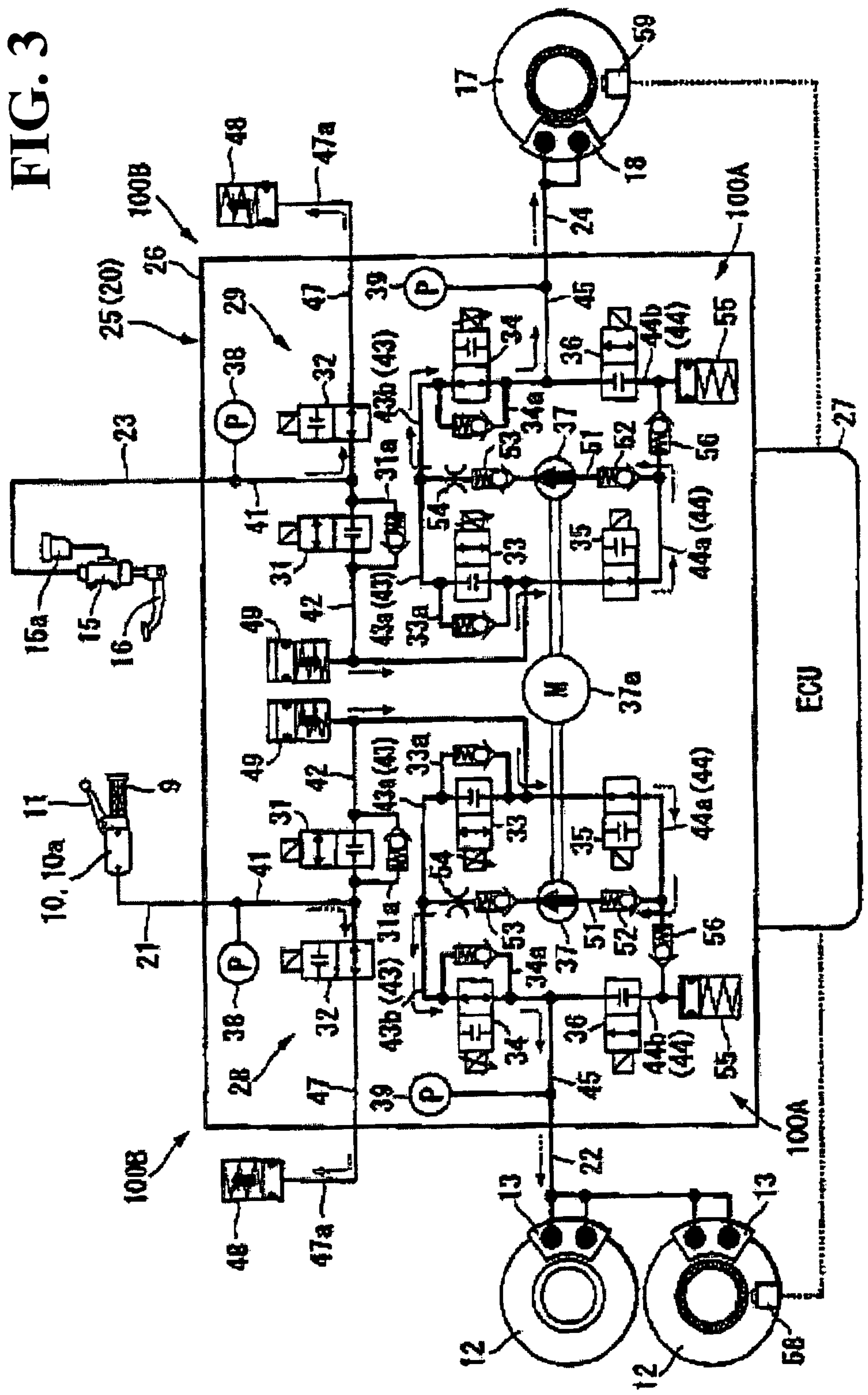
FIG. 3 is an explanatory diagram of a first operation of FIG. 2.

FIG. 3 is a diagram showing an ignition ON state, a brake switch ON state by, for example, a brake operation, and also an ABS non-operative state (hereinafter, referred to as a normal brake state). In this state, the ECU 27 causes the first, second, third and fifth solenoid valves 31, 32, 33 and 35 to be electrically energized, and the fourth and the sixth solenoid valves 34 and 36 to be electrically de-energized. Accordingly, the second, fourth and fifth solenoid valves 32, 34 and 35 open the corresponding hydraulic pressure passages, and the first, third and sixth solenoid valves 31, 33 and 36 block the corresponding hydraulic pressure passages.

In the above-described normal brake state, hydraulic pressures generated in the front and the rear master cylinders 10 and 15 are introduced to the corresponding brake circuits 28 and 29 in the ABS modulator 20, respectively, through the front and the rear input pipes 21 and 23. Thereafter, the introduced hydraulic pressures are further introduced respectively to the stroke simulators 48 through the corresponding simulation passages 47. At this time, the activation of the stroke simulators 48 causes simulative hydraulic pressure reaction forces respectively depending on the amounts of operations of the front and the rear brakes to act respectively on the brake lever 11 and the brake pedal 16. The reaction forces then give a natural operational feeling to the brake controllers. Since the first solenoid valves 31 block the corresponding second hydraulic pressure passages 42, the above operational feeling is stably given independent of changes in hydraulic pressures on the sides of the front and the rear calipers 13 and 18.

In addition, in the above-described normal brake state, based on hydraulic pressure (each of hydraulic pressures of the front and the rear master cylinders 10 and 15) of each of the first hydraulic pressure passages 41, which is detected by the corresponding first hydraulic pressure sensor 38, the ECU 27 activates the corresponding pump 37, and controls the activation of the pump 37. With this control, hydraulic pressure (each of hydraulic pressures of the front and the rear calipers 13 and 18) of the fifth hydraulic pressure passage 45 detected by the second hydraulic pressure sensor 39 can be equal to the above-described detected value by the first hydraulic pressure sensor 38. Accordingly, brake fluid in each upstream-side fourth hydraulic pressure passage 44*a* and each second hydraulic pressure passage 42 are sucked by the pump 37, and are supplied to a corresponding one of the front and the rear calipers 13 and 18 through the downstream-side fourth hydraulic pressure passage 44*b*, the fifth hydraulic pressure passage 45, and corresponding one of the front and the rear output pipes 22 and 24. Consequently, the CBS enters into an operative state in which the front and the rear brakes are interlocked. The flow of the brake fluid during this time is shown by double-dashed chain lines with arrows in FIG. 3.

At this time, the inside brake fluid reservoir 49, each located on the upstream side of sucking of the pump 37, moves to a side on which the capacity of its own fluid chamber is decreased, when a negative pressure is applied on the second fluid pressure passage 42. Each inside brake fluid reservoir 49 then discharges the brake fluid into the corresponding second hydraulic pressure passage 42. With this, an activation resistance of each pump 37 is checked to enable the supplying of the brake fluid as needed to the front and the rear calipers 13 and 18.

As described above, in the brake system in this embodiment, hydraulic pressures generated respectively in the front and the rear master cylinders 10 and 15 are not directly supplied respectively to the front and the rear calipers 13 and 18 at the time of normal braking. Instead, the pumps 37, each serving as a hydraulic pressure generating device, are activated, on the basis of the detected values of the corresponding hydraulic pressures generated respectively in the front and the rear master cylinders 10 and 15. With the activation, hydraulic pressures corresponding to the detected values are supplied respectively to the front and the rear calipers 13 and 18, and thereby braking forces are generated respectively on the front and the rear wheels.

In the normal brake state described above, hydraulic pressures are supplied to both calipers, even when brake operation is performed on only one of the brake operators, i.e. the brake lever 11 and the brake pedal 16. Specifically, hydraulic pressure is supplied to one caliper corresponding to the brake operator on which the brake operation is performed, on the basis of a detected value of the hydraulic pressure of the master cylinder corresponding to the brake operator. Also, hydraulic pressure is supplied to the other caliper since the pumps 37 in the corresponding brake circuits 28 and 29 are interlocked. The brake system of this embodiment is configured as a combined brake system with the pumps 37 working as hydraulic pressure generating devices. It should be noted that, in the above-described state, when another brake operation is further performed on the other brake operator, the activation of each pump 37 is further increased as needed based on a detected value of the hydraulic pressure of the other master cylinder corresponding to the other brake operator. Thereby, hydraulic pressure supplied to the other caliper corresponding to the other brake operator is increased.

In addition, in the normal brake state, the second hydraulic pressure passage 42 is blocked by the first solenoid valve 31 on a brake circuit on the side on which no brake operation is performed. Accordingly, pressure pulsation due to the activation of the pump 37 is not transferred to the corresponding brake operator so that a favorable brake operation feeling can be given by the strike simulator 48. In the same manner, in the above-described state, the pressure pulsation is not transferred even when a brake operation is performed on the other brake operator, so that favorable brake operation feeling can be maintained.

In the normal brake state (the CBS operative state), when it is determined that slip rates respectively on the front and the rear wheels have exceeded predetermined values, the state of the brake system moves into the ABS operative state. On the basis of, for example, detected signals from front and rear wheel speed sensors 58 and 59 which detect the rotating speeds of the front and the rear wheels, an estimated speed of the motorcycle 1 is first obtained by the ECU 27. The slip rates of the front and the rear wheels are then calculated based on a difference between a converted value of a wheel rotating speed of the estimated speed and a real wheel rotating speed. At this time, when the slip rates of the front and the rear wheels have exceeded corresponding predetermined threshold values, it is determined that a slip occurs on the front and the rear wheels, so that the control of the ABS modulator 20 starts. By repeating increase and decrease of supply hydraulic pressures to the front and the rear calipers 13 and 18 by the operations of the solenoid valves 31 to 36 and the motor 37*a*, the ABS modulator 20 controls that the slip rates of the front and the rear wheels are maintained at those being not greater than the threshold.

Figure 4:
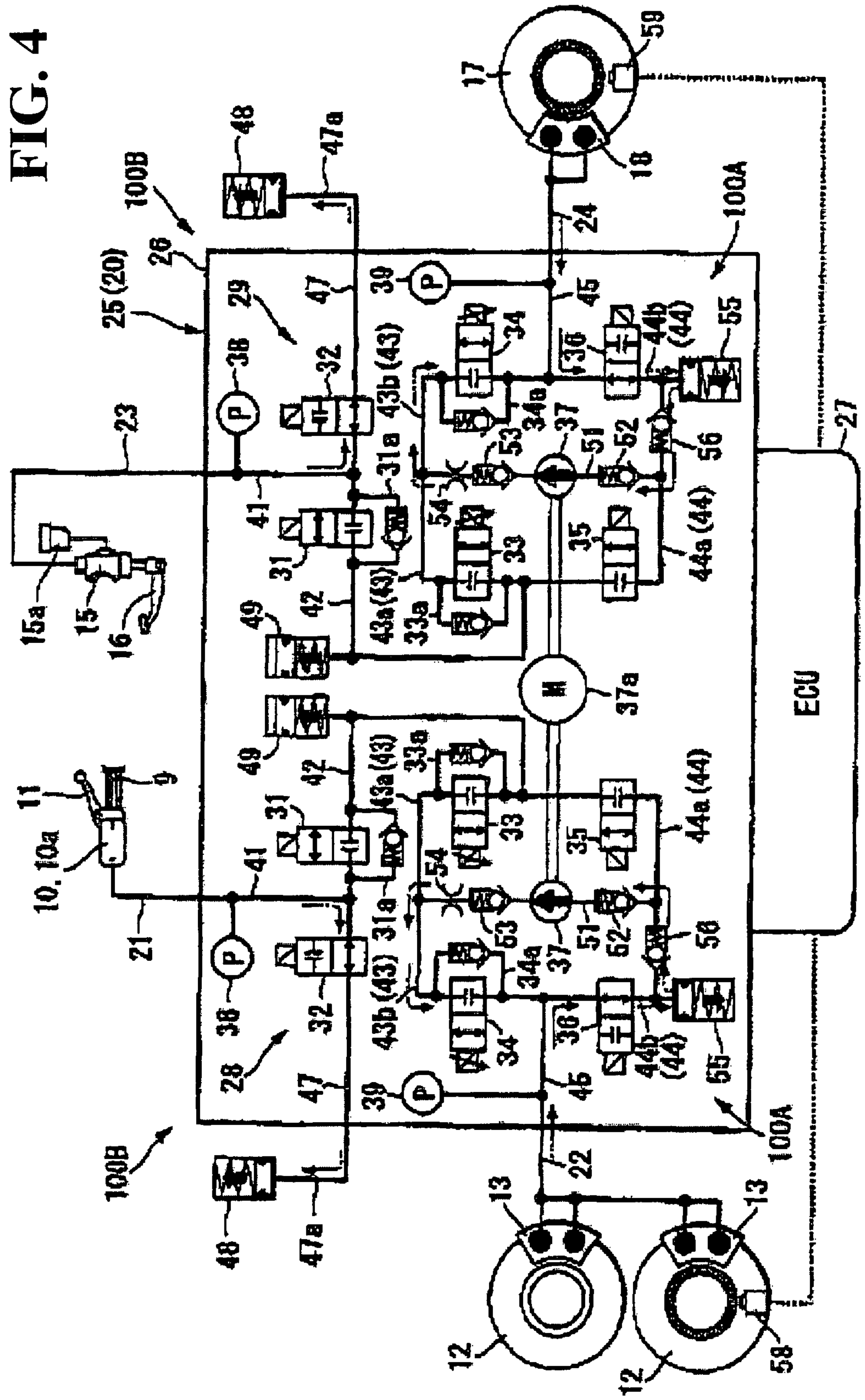
FIG. 4 is an explanatory diagram of a second operation of FIG. 2.

FIG. 4 is a diagram showing a state in which the ABS is activated in the normal brake state. As shown in FIG. 4, in the state in which the ABS is operative, the ECU 27 causes the first, second, third, fourth and sixth solenoid valves 31, 32, 33, 34 and 36 to be electrically energized, and the fifth solenoid valve to be electrically de-energized. Accordingly, the second and the sixth solenoid valves 32 and 36 open the hydraulic pressure passages, respectively. The first, third, fourth and fifth solenoid valves 31, 33, 34 and 35 block the hydraulic pressure passages, respectively.

The above-described ABS operative state is the same as the normal brake state in the following point. Hydraulic pressures generated in the front and the rear master cylinders 10 and 15 are introduced respectively into the simulation passages 47. Simulative hydraulic pressure reaction forces according respectively to the amounts of operations of the front and the rear brakes act on the brake lever 11 and the brake pedal 16, respectively. However, the hydraulic pressures supplied to the front and the rear calipers 13 and 18 are partly introduced respectively into the accumulators 55 through the corresponding downstream-side fourth hydraulic pressure passages 44*b*. Accordingly, the hydraulic pressures in the front and the rear calipers 13 and 18 are decreased, so that braking forces of the front and the rear wheels are decreased. Consequently, the slip rates of the front and the rear wheels are decreased.

Hydraulic pressures introduced into the accumulators 55 are further introduced to the respective downstream-side third hydraulic pressure passages 43*b* through the corresponding pump passages 51 by the activating of the pumps 37. Thus, when the slip rates of the front and the rear wheels become less than or equal to the threshold values, the ECU 27 switches the states of electrical energization of the respective solenoid valves 31 to 36 as needed, so that the state of the brake system is again switched to the normal brake state. In this way, while repeating the ABS operative state and the normal brake state in a short period, brake fluid circulates between the downstream-side third hydraulic pressure passages 43*b* and the downstream-side fourth hydraulic pressure passages 44*b*. Accordingly, the slip rates are controlled to be maintained at values being not greater than the threshold value while providing braking forces to the front and the rear wheels.

Even when the ABS operative state and the normal brake state (CBS operative state) are repeated, the second hydraulic pressure passages 42 in the respective brake circuits 28 and 29 are blocked by the first solenoid valves 31. Thus, the communication between the front cylinder 10 and the corresponding pump 37 and the communication between the rear master cylinder 15 and the corresponding pump 37 are cut off. For this reason, hydraulic pressures supplied respectively to the front and the rear calipers 13 and 18 are increased/decreased with the corresponding pumps 37. On the other hand, when the states of the respective brake circuits 28 and 29 are switched, hydraulic pressure reaction forces are not transferred respectively to the brake operators, so that the brake operation feeling is enhanced. In addition, each pump 37 is shared by the CBS and the ABS as a hydraulic pressure generating device so that reduction in manufacturing costs and reduction in weight can be achieved attributable to the simplification of the structure.

As described above, the brake system of the above-described embodiment is provided with the circulating-type ABSs 100A and the by-wire-type brake systems 100B. The circulating-type ABSs 100A include the fourth and the sixth solenoid valves 34 and 36, the accumulators 55 and the pumps 37. The fourth and the sixth solenoid valves 34 and 36 block the hydraulic pressure passage between the front caliper 13 and the front master cylinder 10, and the hydraulic pressure passage between the rear caliper 18 and the rear master cylinder 15. The accumulators 55 receive the hydraulic pressures of the respective calipers 13 and 18 at the time of the blocking, and the pumps 37 circulate brake fluids respectively from the accumulators 55 to the corresponding hydraulic pressure passages. The by-wire-type brake systems 100B include the first, second, third and fifth solenoid valves 31, 32, 33 and 35, the first hydraulic pressure sensor 38, the second hydraulic pressure sensor 39, the stroke simulators 48 and the inside brake fluid reservoirs 49. The first, second, third and fifth solenoid valves 31, 32, 33 and 35 block the hydraulic pressure passage between the master cylinder 10 and the ABS 100A and the pressure passage between the master cylinder 15 and the ABS 100A. The first hydraulic pressure sensors 38 detect hydraulic pressures of the respective master cylinders 10 and 15. The second hydraulic pressure sensors 39 detect hydraulic pressures of the respective calipers 13 and 18. The stroke simulators 48 receives hydraulic pressures of the respective master cylinders 10 and 15 at the time of operating of the first and the second solenoid valves 31 and 32. The inside brake fluid reservoirs 49 are connected respectively to the hydraulic pressure passages on the downstream sides of the corresponding first and the second solenoid valves 31 and 32, and concurrently on the upstream sides of the corresponding ABSs 100A. The respective solenoid valves 31 to 36, the respective hydraulic pressure sensors 38, 39, the accumulators 55, and the pumps 37 are integrated into one unit in the casing 26; and the stroke simulators 48 are attached to the casing 26 from the outside thereof as a body separated from the above-described unit.

According to the above-described constitution, the stroke simulators 48 may be disposed separately from the unit, the capacity and setting of which are different depending of the types of vehicles, such as a large type or a small type, and a single disk or a double disk.

Furthermore, in the above-described brake system, by disposing the inside brake fluid reservoirs 49 separately from the unit, for the master cylinders 10 and 15 having different capacities, the inside brake fluid reservoirs 49 corresponding respectively to the above cylinders can be selected as needed. Accordingly, there is no need to dispose the inside brake fluid reservoirs 49 each having large (i.e., sufficiently large) capacity in the unit in advance. As a result, reduction in size and weight of a brake system can be achieved.

In the brake system of the present invention, the by-wire-type brake systems 100B are provided respectively to the input circuits of the front and the rear wheels, and thereby a combined brake system can be provided.

Furthermore, in the above-described brake system, each inside brake fluid reservoir 49 is connected to the hydraulic pressure passage between each ABS 100A and the first and the second solenoid valves 31 and 32. Accordingly, further simplification of the hydraulic pressure passages can be achieved.

Embodiment 2

A second embodiment of the present invention will now be described with reference to FIG. 5. This embodiment is different from the first embodiment in that the by-wire-type brake system 100B is provided only to an input circuit of the front brake. The same reference numerals are given to the same components as those in the first embodiment.

Figure 5:
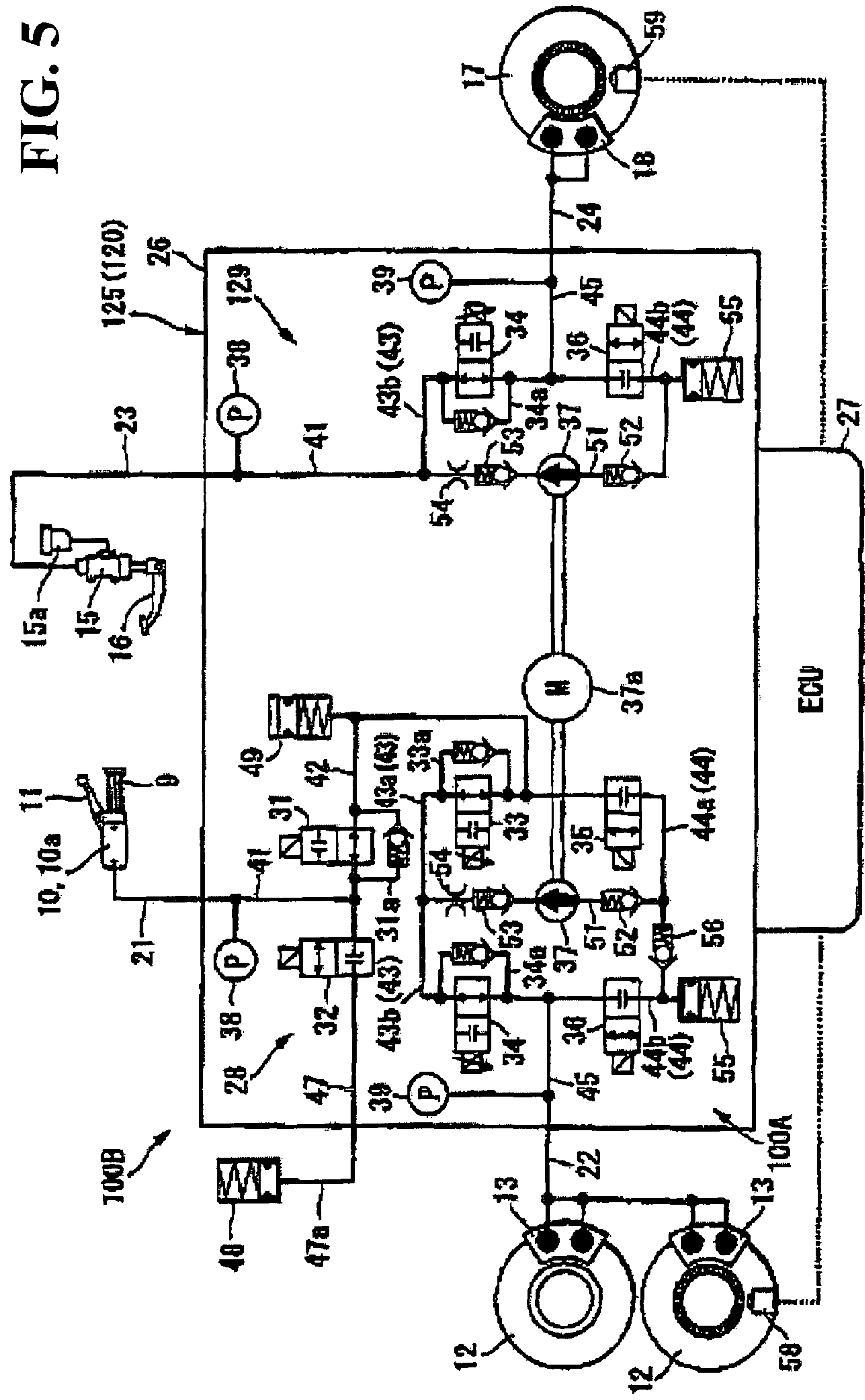
FIG. 5 is an explanatory diagram of a constitution of a brake system of a second embodiment of the present invention.

As shown in FIG. 5, a hydraulic pressure circuit section 125 of an ABS modulator 120 is provided with a front wheel brake circuit 28 and a rear wheel brake circuit 129, which are independent of each other.

The brake circuit 28 is the same as one used in the first embodiment. The rear wheel brake circuit 129 is provided with a first hydraulic pressure circuit 41 to which a rear input pipe 23 is connected. The first hydraulic pressure circuit 41 is provided with the first hydraulic pressure sensor 38. The first hydraulic pressure passage 41 is connected on its downstream side to a junction of the pump passage 51 and the downstream-side third hydraulic pressure passage 43*b*. The downstream-side third hydraulic pressure passage 43*b* is joined on its downstream side to the downstream-side fourth hydraulic pressure passage 44*b*, thus becoming the fifth hydraulic pressure passage 45. The fifth hydraulic pressure passage 45 is provided with the second hydraulic pressure sensor 39. That is, in the rear wheel brake circuit 129, the second hydraulic passage 42, the upstream-side third and fourth hydraulic pressure passages 43*a* and 44*a*, the simulation passage 47, as well as the valves, the simulators and the like provided to the above are omitted unlike the case in the first embodiment.

The operation of the brake system according to the second embodiment will now be described. FIG. 5 is a diagram showing an electrically de-energization state in which power supplies to the solenoid valves 31 to 36 and the pumps 37 are stopped. In this state, in the front wheel brake circuit 28, the first, third and fourth solenoid valves 31, 33 and 34 open hydraulic pressure passages, respectively; and the second, fifth and sixth solenoid valves 32, 35 and 36 block corresponding hydraulic pressure passages, respectively. In the rear wheel brake circuit 129, the fourth solenoid valve 34 opens a hydraulic pressure passage, and the sixth solenoid valve 36 blocks a hydraulic pressure passage.

In the above-described state, as in the case of the first embodiment, hydraulic pressure generated in the front master cylinder 10 is directly supplied to the front caliper 13 without increasing/decreasing. Hydraulic pressure generated in the rear master cylinder 15 is introduced into the rear wheel brake circuit 129 in the ABS modulator 120 from the rear input pipe 23. The introduced hydraulic pressure is then outputted without increasing/decreasing through the first hydraulic pressure passage 41, the downstream-side third hydraulic pressure passage 43*b* and the fifth hydraulic pressure passage 45. Thereafter the outputted hydraulic pressure is directly supplied to the rear caliper 18 through the rear output pipe 24.

In the above-described normal brake state, as in the case of the first embodiment, the ECU 27 controls the states of energization of the respective solenoid valves 31 to 36 in the front wheel brake circuit 28. In the rear wheel brake circuit 129, the maintaining of a state in which the fourth and the sixth solenoid valves 34 and 36 are electrically de-energized causes a state to be maintained, in which state the fourth solenoid valve 34 opens the hydraulic pressure passage, and the sixth solenoid valve 36 blocks the hydraulic pressure passage.

In the above-described normal brake state, at the time of operating the front wheel brake, in the front wheel brake circuit 28, hydraulic pressure generated in the front master cylinder 10 is introduced into the stroke simulator 48 through the simulation passage 47. In addition, on the basis of hydraulic pressure (hydraulic pressure of the front master cylinder 10) of the first hydraulic pressure passage 41, which hydraulic pressure is detected by the first hydraulic pressure sensor 38, the ECU 27 activates the corresponding pump 37. By the activation, brake fluid in the inside brake fluid reservoir 49 is supplied to the front calipers 13 so that hydraulic pressure of the fifth hydraulic pressure passage 45 (hydraulic pressure of the front calipers 13), which hydraulic pressure is detected by the second hydraulic pressure sensor 39, can be the same as the above-described detected value.

That is, the front brake is constituted as a by-wire-type brake system. In the by-wire-type front brake, hydraulic pressure generated in the front master cylinder 10 is not directly supplied to the front calipers 13, but is supplied thereto by the operation of the pump 37 serving as a hydraulic pressure generating device.

In the above-described normal brake state, at the time of operating the rear wheel brake, in the rear wheel brake circuit 129, hydraulic pressure generated in the rear master cylinder 15 is directly supplied to the rear caliper 18 without increasing/decreasing.

At this time, in the front wheel brake circuit 28, as in the above case, the passages between the front master cylinder 10 and the front calipers 13 are blocked and, at the same time, the pump 37 is activated. In this manner, hydraulic pressure is generated in the front calipers 13 on the basis of hydraulic pressure generated in the rear master cylinder 15. That is, a suitable braking force is distributed to the front wheel brake on the basis of the hydraulic pressure generated in the rear master cylinder (CBS operation).

In the normal brake state (CBS operative state), when slip rates on the front and the rear wheels have exceeded predetermined values, the brake system enters into the ABS operative state.

In the ABS operative state, for the front wheel brake, as in the case of the first embodiment, hydraulic pressures of the front calipers 13 are decreased using the accumulator 55, and thereby the front braking force is decreased. While repeating the ABS operative state and the normal brake state in a short period, hydraulic pressure introduced into the accumulator 55 circulates between the downstream-side third hydraulic pressure passage 43*b* and the downstream-side fourth hydraulic pressure passage 44*b* by the operation of the pump 37. Additionally, while giving a braking force to the front wheel, its slip rate is controlled to be maintained at that not greater than a threshold value. At this time, because the front wheel brake is of a by-wire type, a hydraulic pressure reaction force occurred due to increase/decrease of hydraulic pressure supplied to the front calipers 13 is not transferred to the brake lever 11 which the rider operates with his/her hand.

At the time of the operation of the ABS, for the rear wheel brake, the fourth and the sixth solenoid valves 34 and 36 are caused to be electrically energized, causing a state in which the fourth solenoid valve 34 blocks the hydraulic pressure passage, and the sixth solenoid valve 36 opens the hydraulic pressure passage. This causes the communications between the rear master cylinder 15 and the rear caliper 18 to be cut off, and part of the hydraulic pressure supplied to the rear caliper 18 is introduced into the accumulator 55. Accordingly, the hydraulic pressure of the rear caliper 18 is decreased to thereby decrease the brake force of the rear wheel. The hydraulic pressure introduced into the accumulator 55 circulates towards the upstream side on which the hydraulic pressure is discharged (the side of the first hydraulic pressure passage 41). While repeating this ABS operative state and the normal brake state in a short period, the slip rate of the rear wheel is controlled so that the slip rate is maintained at that being not greater than a threshold value, with giving a braking force to the rear wheel.

As described above, the brake system of the second embodiment includes the front and the rear input circuits, which are independent of each other. The by-wire-type brake system 100B is provided to the input circuit of the front wheel brake. Also, the front wheel brake force is increased by detecting hydraulic pressure of the input circuit of the rear wheel brake. This makes it possible to provide an inexpensive brake system in which the front wheel brake circuit interlocks with the rear wheel brake circuit only at the time of operating the rear brake. Furthermore, a reduction in size and cost of a system can be achieved.

Figure 6:
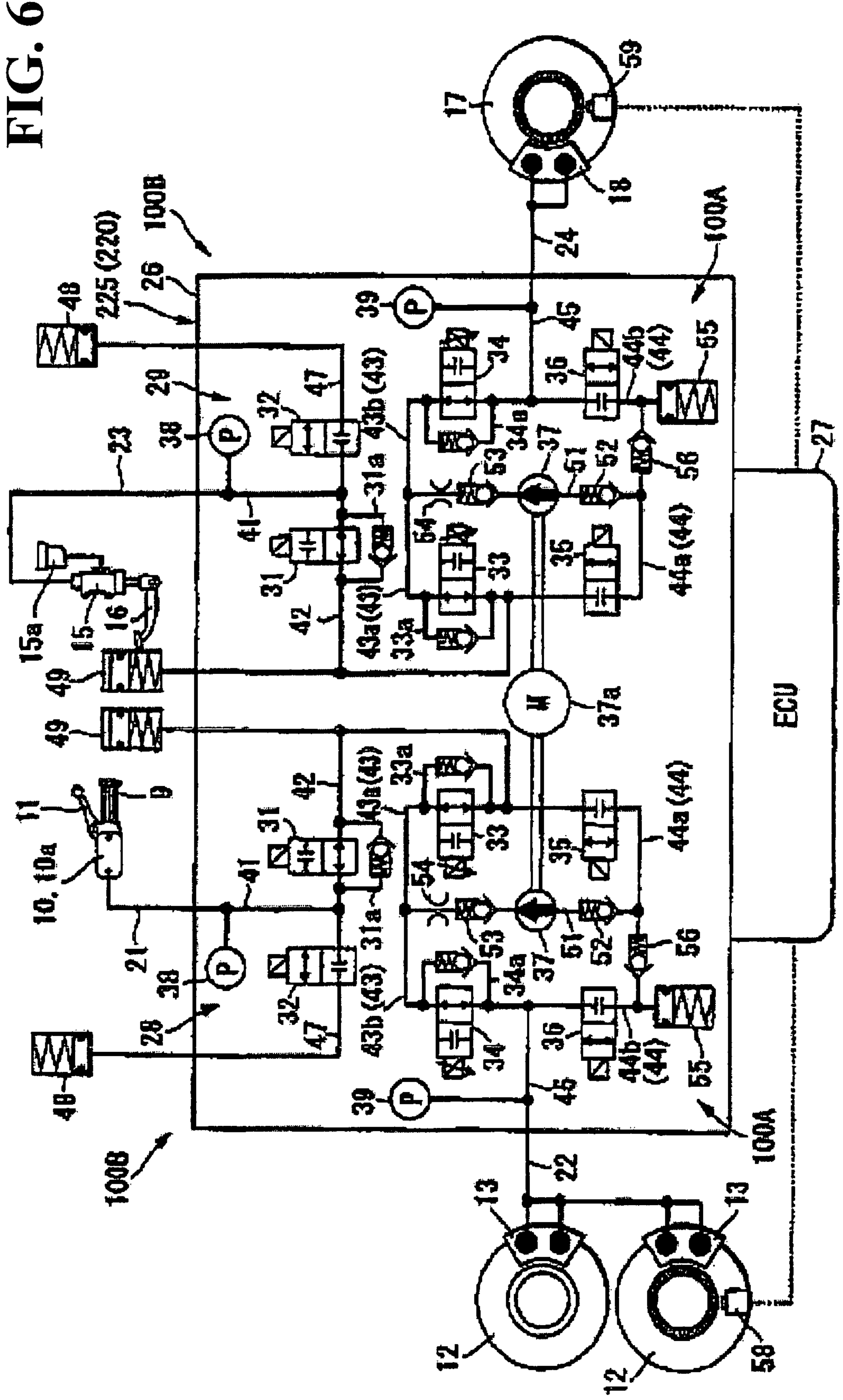
FIG. 6 is an explanatory diagram of a constitution for showing a first application of the brake system shown in FIG. 2.

It should be noted that, the present invention is not limited to the above-described embodiments. For example, in the first embodiment, as in a hydraulic pressure circuit section 225 of an ABS modulator 220 shown in FIG. 6, it is possible to integrate into one unit, the solenoid valves 31 to 36, the respective hydraulic pressure sensors 38 and 39, the accumulators 55, and the pumps 37 and to attach the inside brake fluid reservoirs 49 to the casing 26 from outside thereof as a body separated from the unit. According to this constitution, for the master cylinders 10 and 15 having different capacities, the inside brake fluid reservoirs 49 corresponding respectively to the cylinders can be selected as needed. Accordingly, there is no need to set, inside the unit, the inside brake fluid reservoirs 49 each having a large (i.e., sufficiently large) capacity, in advance. As a result, reduction in size and weight of a brake system can be achieved.

Figure 7:
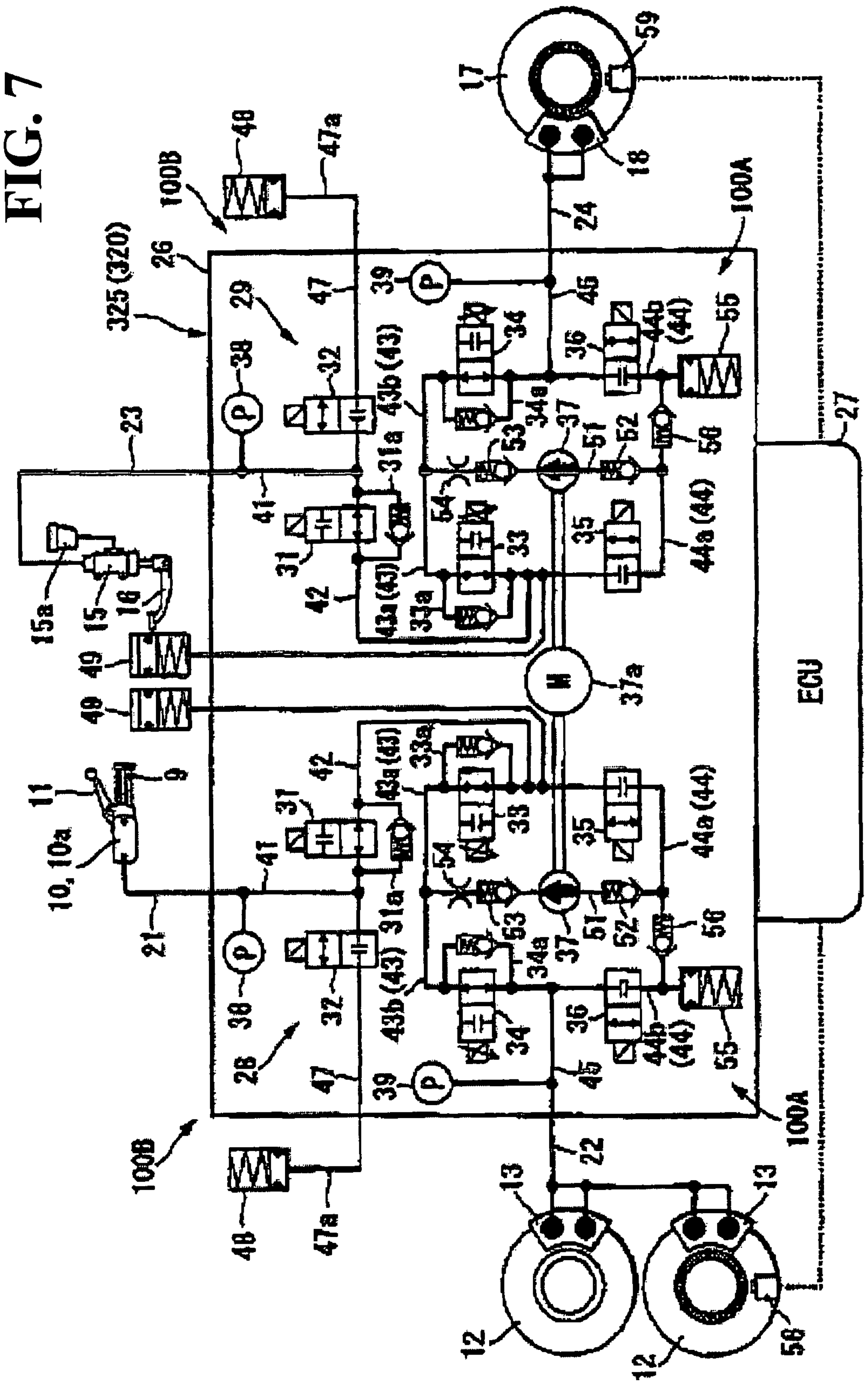
FIG. 7 is an explanatory diagram of a constitution for showing a second application of the brake system shown in FIG. 2.

Furthermore, as in a hydraulic pressure circuit section 325 of an ABS modulator 320 shown in FIG. 7, it is possible to attach the inside brake fluid reservoirs 49 to the casing 26 from the outside thereof, and also to connect each of the inside brake fluid reservoirs 49 to a hydraulic pressure passage between the corresponding third and fifth solenoid valves 33 and 35. According to this constitution, the hydraulic pressure passage can be further simplified.

Figure 8:
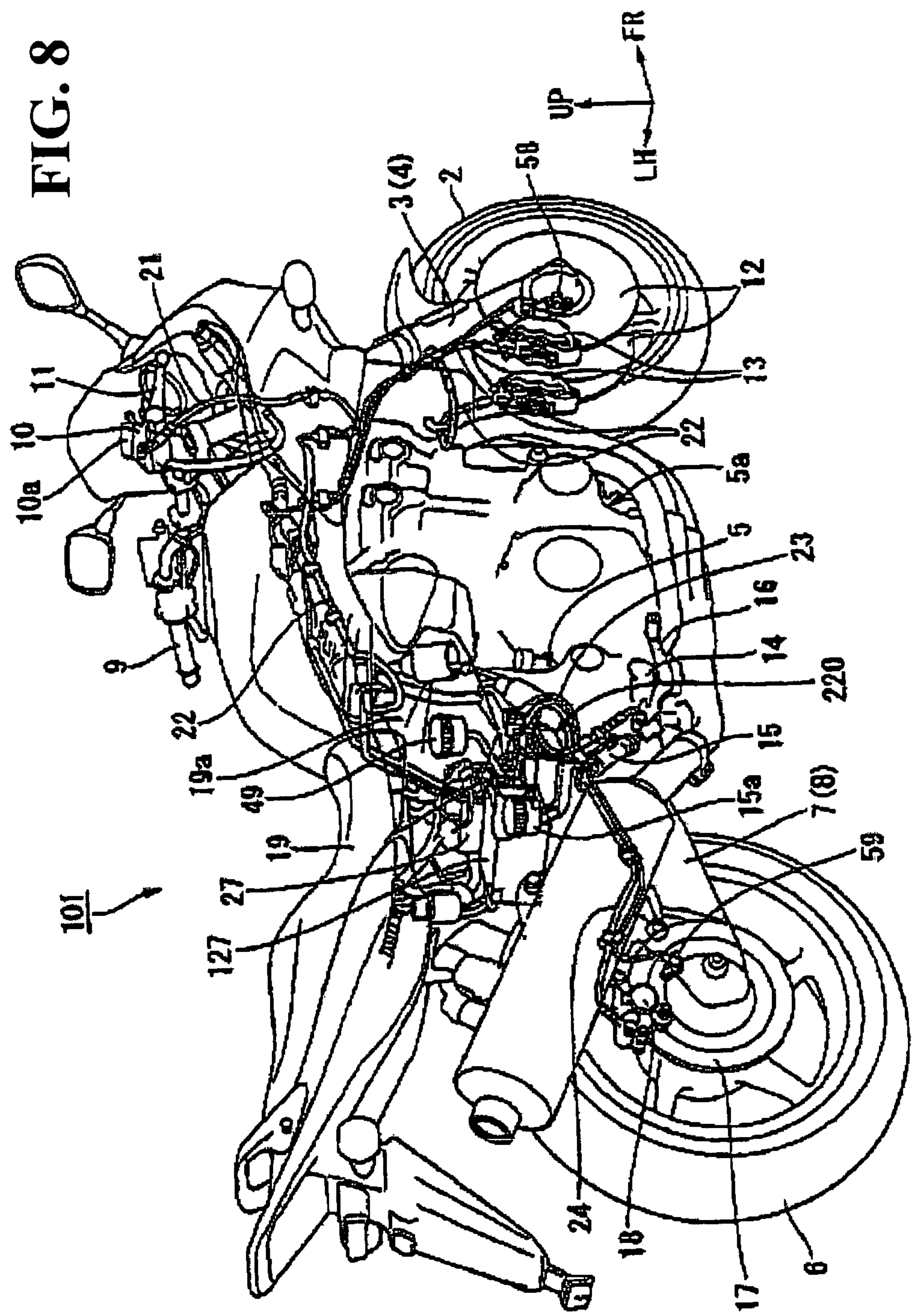
FIG. 8 is a perspective view of a motorcycle provided with the brake system shown in FIG. 6, as viewed from the rear right of the motorcycle.

FIG. 8 shows a motorcycle 101 provided with the above-described ABS modulator 220 (or 320). It should be noted that, in the case of the motorcycle 101, the same reference numerals are given to the same components in FIG. 8 as those of the above-described motorcycle 1. Accordingly, descriptions thereof are omitted.

As shown in FIG. 8, the ABS modulator 220 (or 320) is disposed substantially in the center of the body of the motorcycle 101 (on the rear side of the engine 5*a*, and above an end portion of the swing arm 7 at the side of the pivot). The ECU 27 and a battery 127 serving as an on-board power supply are disposed close to each other, immediately above, and diagonally backward of, the ABS modulator 220. Furthermore, the inside brake fluid reservoirs 49 are disposed above the ABS modulator 220.

The inside brake fluid reservoirs 49 are positioned, below the sheet 19 (an article storage space or the like), and inward of the side cover 19*a*. Accordingly, by detaching the sheet 19 or the side cover 19*a*, the inside brake fluid reservoirs 49 can be maintained.

In addition, the inside brake fluid reservoirs 49 are disposed in a portion higher than the ABS modulator 220 is. This makes it possible to improve air bleeding and the like. Furthermore, this makes it possible to employ a normal brake reservoir tank (the same as the outside brake reservoir 15*a*) as each of the inside brake fluid reservoirs 49. The normal brake reservoir tank is that consisting of a resin-made container with a cap, in which a diaphragm is incorporated (that is, having a top portion opened to the air).

Furthermore, it is also possible to employ a configuration in which only one inside brake fluid reservoir 49 is provided for the ABS modulator 220 (that is, a configuration in which one inside brake fluid reservoir is shared by the front and rear wheel brake circuits 28 and 29). By employing such a configuration, weight and manufacturing costs of the system can be reduced.

Furthermore, in the second embodiment, the hydraulic pressure sensors 38 and 39 are left in the rear wheel brake circuit 129, which hydraulic pressure sensors 38 and 39 detect hydraulic pressure of the rear master cylinder 15 or of the rear caliper 18. However, these sensors may be eliminated to further simplify the hydraulic pressure circuits.

In each embodiment, each of the inside brake fluid reservoirs 49 is described taking that including pistons, cylinders and springs, as examples. However, any shape and structure can be applicable, as long as the fluid reservoir has a variable fluid chamber capacity, and concurrently is blocked.

Furthermore, the first solenoid valve 31 may be used as a passage switching valve, which selectively connects a hydraulic pressure passage on the master cylinder side and a hydraulic pressure valve on the stroke simulator side, and the second solenoid valve 32 may be eliminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake system of a motorcycle, comprising:

a circulating ABS, said circulating ABS including:

an ABS solenoid valve that blocks a hydraulic pressure passage between a caliper and a master cylinder; and an accumulator that receives hydraulic pressure of the caliper when the solenoid blocks the hydraulic pressure passage; and a pump that circulates brake fluid from the accumulator to the hydraulic pressure passage; and a by-wire brake system, said by-wire brake system including:

by-wire solenoid valves comprising a normally-open first solenoid valve and a normally-closed second solenoid valve, and configured to block a hydraulic pressure passage between the master cylinder and the ABS, said hydraulic pressure passage between the master cylinder and the ABS including a simulation passage;

a first hydraulic pressure sensor that detects the hydraulic pressure of the master cylinder;

a second hydraulic pressure sensor that detects the hydraulic pressure of the caliper;

a stroke simulator that is connected to the simulation passage and receives the hydraulic pressure of the master cylinder during operation of the normally-closed second solenoid valve; and a fluid reservoir connected to a hydraulic pressure passage on a downstream side of the normally-open first solenoid valve and on an upstream side of the ABS, the fluid reservoir being equipped with a piston, wherein the ABS solenoid valve, the normally-open first solenoid valve and the normally-closed second solenoid valve of the by-wire solenoid valves, the first hydraulic pressure sensor, the second hydraulic pressure sensor, the accumulator and the pump are integrated into one unit, and the stroke simulator is hydraulically attached to the one unit but physically separated from the one unit, wherein the fluid reservoir is attached to the one unit as a separate body and connected to the hydraulic pressure passage between the by-wire solenoid valves and the ABS, and wherein the circulating ABS is provided with a front wheel brake circuit and a rear wheel brake circuit which are independent of each other.

2. The brake system of a motorcycle according to claim 1, further comprising a front input circuit of a front wheel brake and a rear input circuit of a rear wheel brake that are independent of each other, wherein the by-wire brake system is provided to the front input circuit, and the hydraulic pressure of the rear input circuit is detected, and thus a front wheel braking force is increased.

3. The brake system of a motorcycle according to claim 1, wherein the by-wire brake system is provided to each one of input circuits of the front and the rear wheel brakes.

4. A vehicle brake system, comprising:

a circulating ABS, said circulating ABS including:

an ABS solenoid valve; and an accumulator that receives hydraulic pressure during operation of the ABS solenoid valve; and a pump that circulates brake fluid from the accumulator; and a by-wire brake system, said by-wire brake system including:

by-wire solenoid valves comprising a normally-open first solenoid valve and a normally-closed second solenoid valve, and configured to block a hydraulic pressure passage between the master cylinder and the ABS, said hydraulic pressure passage between the master cylinder and the ABS including a simulation passage;

a master cylinder hydraulic pressure sensor;

a caliper hydraulic pressure sensor; and a stroke simulator that is connected to the simulation passage and receives hydraulic pressure during operation of the normally-closed second solenoid valve; and a fluid reservoir connected to a downstream side of the normally-open first solenoid valve and an upstream side of the ABS, the fluid reservoir being equipped with a piston, wherein the fluid reservoir is attached to the one unit as a separate body, wherein the ABS solenoid valve, the normally-open first solenoid valve and the normally-closed second solenoid valve of the by-wire solenoid valves, the master cylinder hydraulic pressure sensor, the caliper hydraulic pressure sensor, the accumulator and the pump are integrated into one unit, and the stroke simulator is hydraulically attached to the one unit but physically separated from the one unit, and wherein the circulating ABS is provided with a front wheel brake circuit and a rear wheel brake circuit which are independent of each other.

5. The vehicle brake system according to claim 4, further comprising a front input circuit of a front wheel brake and a rear input circuit of a rear wheel brake that are independent of each other, wherein the by-wire brake system is provided to the front input circuit, and the hydraulic pressure of the rear input circuit is detected, and thus a front wheel braking force is increased.

6. The vehicle brake system according to claim 4, wherein the by-wire brake system is provided to each one of input circuits of the front and the rear wheel brakes.

7. The vehicle brake system according to claim 4, wherein the fluid reservoir is connected to the hydraulic pressure passage between the by-wire solenoid valves and the ABS.

8. The vehicle brake system according to claim 5, wherein the fluid reservoir is connected to the hydraulic pressure passage between the by-wire solenoid valves and the ABS.

9. The vehicle brake system according to claim 6, wherein the fluid reservoir is connected to the hydraulic pressure passage between the by-wire solenoid valves and the ABS.

* * * * *